US009249601B2

(12) United States Patent
Dawber

(10) Patent No.: US 9,249,601 B2
(45) Date of Patent: Feb. 2, 2016

(54) CONVERSION SYSTEM FOR MECHANICAL KEYS

(75) Inventor: Fred Dawber, Burlington (CA)

(73) Assignee: Smartkey, Inc. (CA)

( * ) Notice: Subject to any disclaimer, the term of this patent is extended or adjusted under 35 U.S.C. 154(b) by 408 days.

(21) Appl. No.: 13/256,941

(22) PCT Filed: Aug. 31, 2009

(86) PCT No.: PCT/CA2009/001205
§ 371 (c)(1), (2), (4) Date: Nov. 30, 2011

(87) PCT Pub. No.: WO2010/105333
PCT Pub. Date: Sep. 23, 2010

(65) Prior Publication Data

US 2012/0153027 A1 Jun. 21, 2012

Related U.S. Application Data

(60) Provisional application No. 61/161,080, filed on Mar. 18, 2009.

(51) Int. Cl.
*G06K 19/06* (2006.01)
*E05B 19/00* (2006.01)
*G07C 9/00* (2006.01)

(52) U.S. Cl.
CPC ............ *E05B 19/00* (2013.01); *G07C 9/00309* (2013.01); *G07C 9/00857* (2013.01); *G07C 9/00817* (2013.01); *Y10T 29/49002* (2015.01)

(58) Field of Classification Search
USPC .......................................................... 235/492
See application file for complete search history.

(56) References Cited

U.S. PATENT DOCUMENTS 7,407,110 B2 8/2008 Davis et al.
2006/0044109 A1* 3/2006 Griffits .................. E05B 17/103 340/5.65
2006/0266089 A1* 11/2006 Dimig ..................... B60R 25/24 70/252
2007/0090921 A1 4/2007 Fisher
2007/0137269 A1* 6/2007 Morehart ................ E05B 19/04 70/408
2011/0072870 A1* 3/2011 Downes ............... A45C 11/328 70/456 R

OTHER PUBLICATIONS

International Search Report PCT/CA20090/001205; published Sep. 23, 2010 (WO 2010/105333 A1) along with Written Opinion completed Dec. 7, 2009.
International Search Report PCT/CA20090/001205: published Sep. 23, 2010 (WO 2010/105333 A1).

* cited by examiner

*Primary Examiner* — Michael G Lee
*Assistant Examiner* — David Tardif
(74) *Attorney, Agent, or Firm* — Tarolli, Sundheim, Covell & Tummino LLP

(57) ABSTRACT

A system is disclosed and includes an adapter, an activation apparatus and a sensor apparatus. The adapter is for use with a mechanical key. The adapter comprises a body which includes an RFID assembly and which, in use, is securely coupled to the head of said key. The activation apparatus is for use with a key to which a body is securely coupled and comprises an RFID writer operable to encode said RFID assembly to form an RFID-tagged mechanical key. The sensor apparatus is for use with an RFID-tagged mechanical key and comprises an RFID reader adapted to output data in standard Wiegand format in the presence of said RFID-tagged mechanical key. Methods for use with the system are also disclosed.

7 Claims, 5 Drawing Sheets

CONVERSION SYSTEM FOR MECHANICAL KEYS

FIELD OF THE INVENTION

The present invention relates to the fields of locksmithing and electronic access control.

BACKGROUND

Mechanical key lock sets have been widely utilized throughout the world for access control purposes for many years. The tumbler style is a very common mechanical key lock style. In recent years, electronic locks have become more common. These can be implemented in at least combination, magnetic strip and proximity form. The combination form typically involves a keypad, into which a series of digits and/or letters is entered. The series is relayed electronically to a security panel which looks for the same series in a database it maintains, and, in the event of match, actuates a lock through, for example, a solenoid. In the magnetic strip version, a card bearing a magnetic strip is swiped through a card reader for actuation of the lock. The proximity version, which is increasing in popularity, often includes a passive RFID tag included in a card or fob.

In commercial, industrial and institutional settings, electronic locks are attractive, since the security panel can be programmed for differentiated access, i.e. the card/code/fob assigned to one person may provide access to areas to which the cards/codes/fobs assigned to other persons do not permit access. As well, in the event of termination, the panel can be updated to deny access to the assigned card/code/fob. Additionally, the panel can be programmed to record access activity to a controlled access area, which further enhances security.

A drawback associated with electronic lock technology is substantially increased incremental installation cost in comparison to mechanical key lock sets, especially in retrofit situations. Accordingly, especially in retrofit situations, it is commonplace to employ a combination of mechanical and electrical access control. This often results in the need for employees to be issued a mechanical key, an identification badge and an electronic credential, which can become cumbersome.

SUMMARY OF THE INVENTION

An adapter for use with a mechanical key forms one aspect of the invention. The adapter comprises a body which includes an RFID assembly. The body, in use, is securely coupled to the head of said key and forms, in combination with said key, an RFID-tagged mechanical key. The key can be of the type for a tumbler style lock.

According to another aspect, the body can include a receiver and a coupler. In use, the receiver receives the head of said key and the coupler is securely engaged to the receiver to provide for said secure coupling to said key of the body.

According to another aspect, the RFID assembly can be held in spaced relation to the head of said key.

Activation apparatus forms another aspect of the invention. The activation apparatus is for use with a key to which the adapter body is securely coupled. The activation apparatus comprises an RFID writer operable to encode the RFID assembly of said body to form said RFID-tagged mechanical key.

Sensor apparatus forms yet another aspect of the invention. The sensor apparatus is for use with the RFID-tagged mechanical key. The sensor apparatus comprises an RFID reader adapted to output, in standard Wiegand format and in the presence of said RFID-tagged mechanical key, data encoded on said RFID-tagged mechanical key.

A system forms yet another aspect of the invention. The system comprises the adapters, the activation apparatus and the sensor apparatus. This system can be used in a method which forms another aspect of the invention. This method is for use in a facility wherein a mechanical key lock is utilized and comprises the steps of:

- taking possession of a key for said mechanical key lock;
- using an adapter and the activation apparatus to produce an RFID-tagged mechanical key for said lock; and
- in said facility, operatively installing sensor apparatus which is adapted to output, in standard Wiegand format and in the presence of said tagged key for said lock, data encoded on said RFID-tagged mechanical key for said lock.

According to yet another aspect, the system can further comprise marking apparatus, for creating visual demarcations on the body of an RFID-tagged mechanical key. This system can be used in another method which forms another aspect of the invention.

This method is for use in a facility wherein a mechanical lock is utilized and comprises the steps of:

- taking possession of keys for said lock and thereafter, for each key, in sequence: using an adapter and the activation apparatus to produce an RFID-tagged mechanical key for said lock;
- marking said tagged keys with the images of authorized key bearers;
- operatively installing sensor apparatus in the facility; and
- distributing the marked keys.

In this method, the sensor apparatus is adapted to output data in standard Wiegand format only in the presence of the RFID-tagged keys for said lock.

The systems can be used in a business method which forms yet another aspect of the invention. In this method, one or both of the systems is/are made available to dealers in a manner such that:

- each dealer has a unique identifier, which identifier is encoded on the RFID-tagged mechanical keys produced by said each dealer; and
- the sensor apparatuses made available to each dealer are adapted to output data in standard Wiegand format only in the presence of a key encoded with the unique identifier of said each dealer.

Forming yet another aspect of the invention is another method. This method is for use in a facility wherein a mechanical key lock is utilized, the method comprising the steps of: creating a key for said lock to which an RFID credential is permanently secured; encoding said credential with a site number unique to said facility and with an identifier that is unique in said facility; and securing an access point in said facility with a lock that is actuated in response to the presence of said credential.

Forming yet another aspect of the invention is a system. This system comprises:

mechanical keys which each include an RFID credential; activation apparatus operable to encode the RFID credentials of said keys; and sensor apparatus each in the form of an RFID reader adapted to output data in standard Wiegand format in the presence of the encoded RFID credentials.

The system can further comprise marking apparatus, for creating visual demarcations on the body of the keys. This system can be made available as part of a business method. In this method, the system is made available in a manner such that: each dealer has a unique identifier, which identifier is encoded on the mechanical keys produced by said each dealer; and the sensor apparatuses made available to each dealer are adapted to output data in standard Wiegand format only in the presence of a key encoded with the unique identifier of said each dealer.

According to other aspects, blanks can be provided to the dealers, which blanks are cut by the dealers to form the mechanical keys; or adapters are provided to the dealers, which adapters are used by the dealers to converting existing mechanical keys into the mechanical keys.

Other advantages and features of the invention will become apparent to persons of ordinary skill in the art upon review of the following detailed description of an exemplary embodiment of the invention and the appended drawings, the latter being briefly described hereinafter.

DETAILED DESCRIPTION

Figure 1:
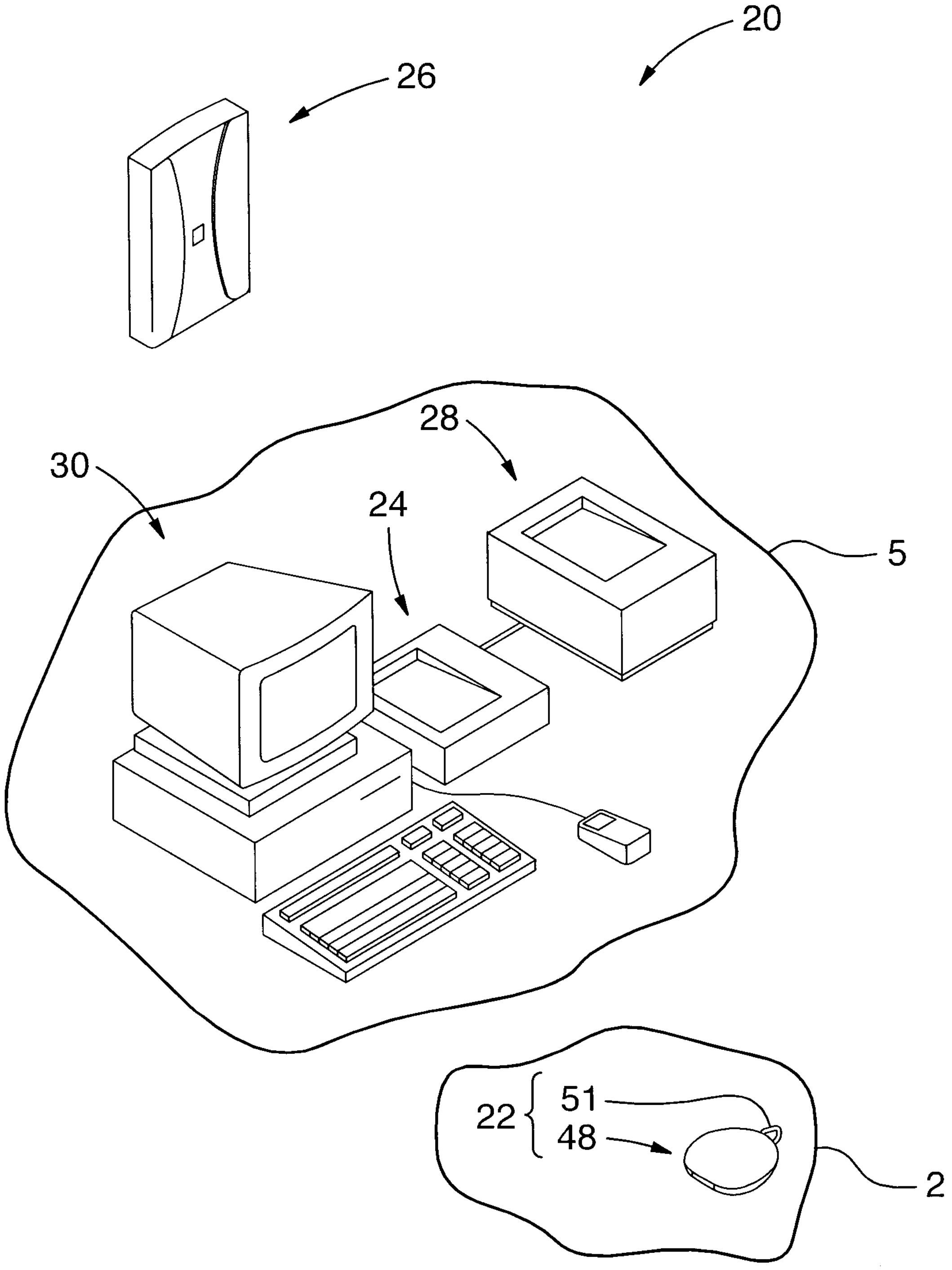
FIG. 1 is a view of the components of an exemplary embodiment of a system according to an exemplary embodiment of the invention.

Exemplary components of a system 20 according to an exemplary embodiment of the present invention are shown in FIG. 1 and these components will be seen to include an adapter 22, an activation apparatus 24, a sensor apparatus 26, a marking apparatus 28 and a controller 30.

Figure 2:
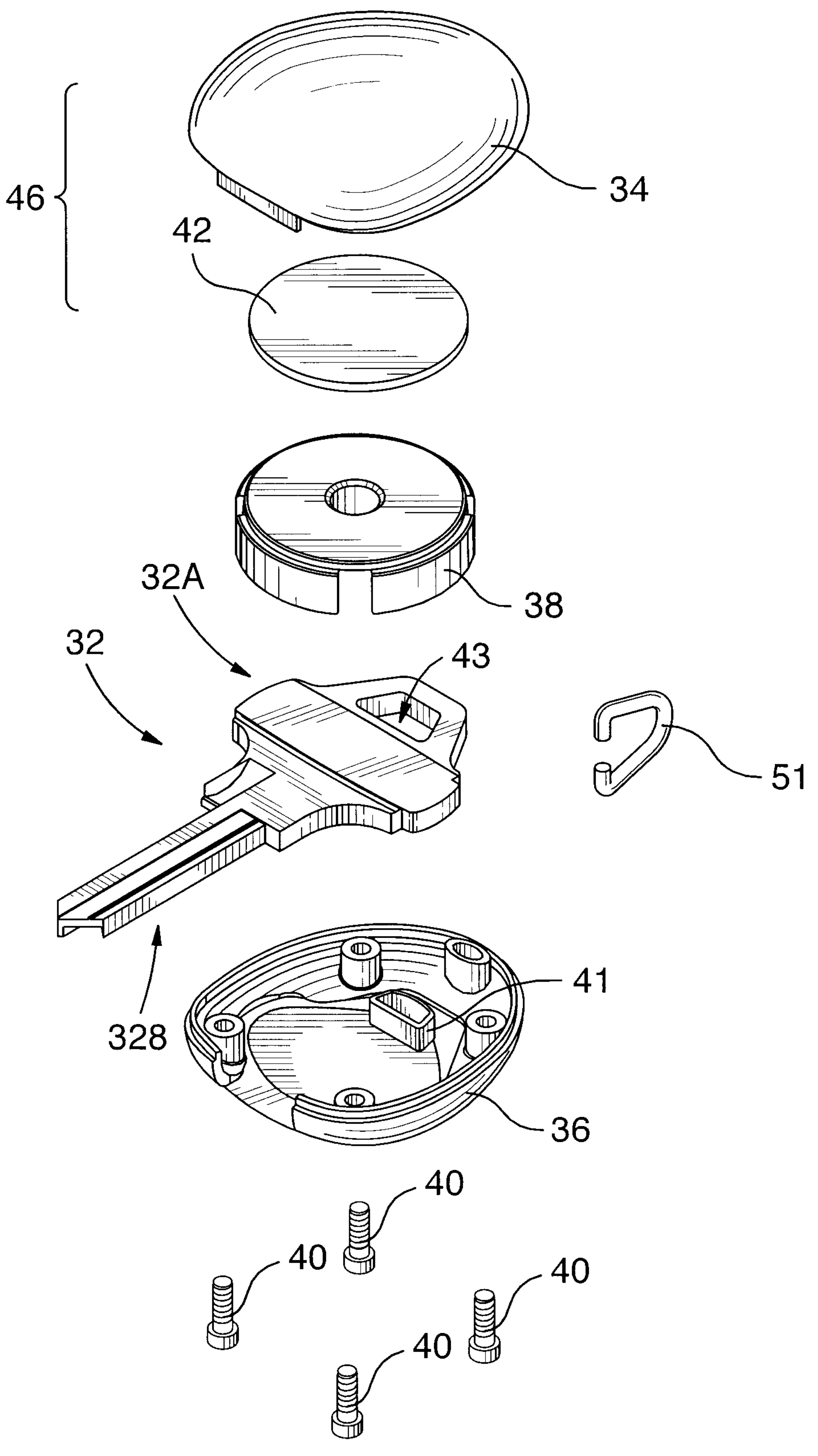
FIG. 2 is an exploded view of encircled structure 2 in FIG. 1, in combination with a key.
Figure 3:
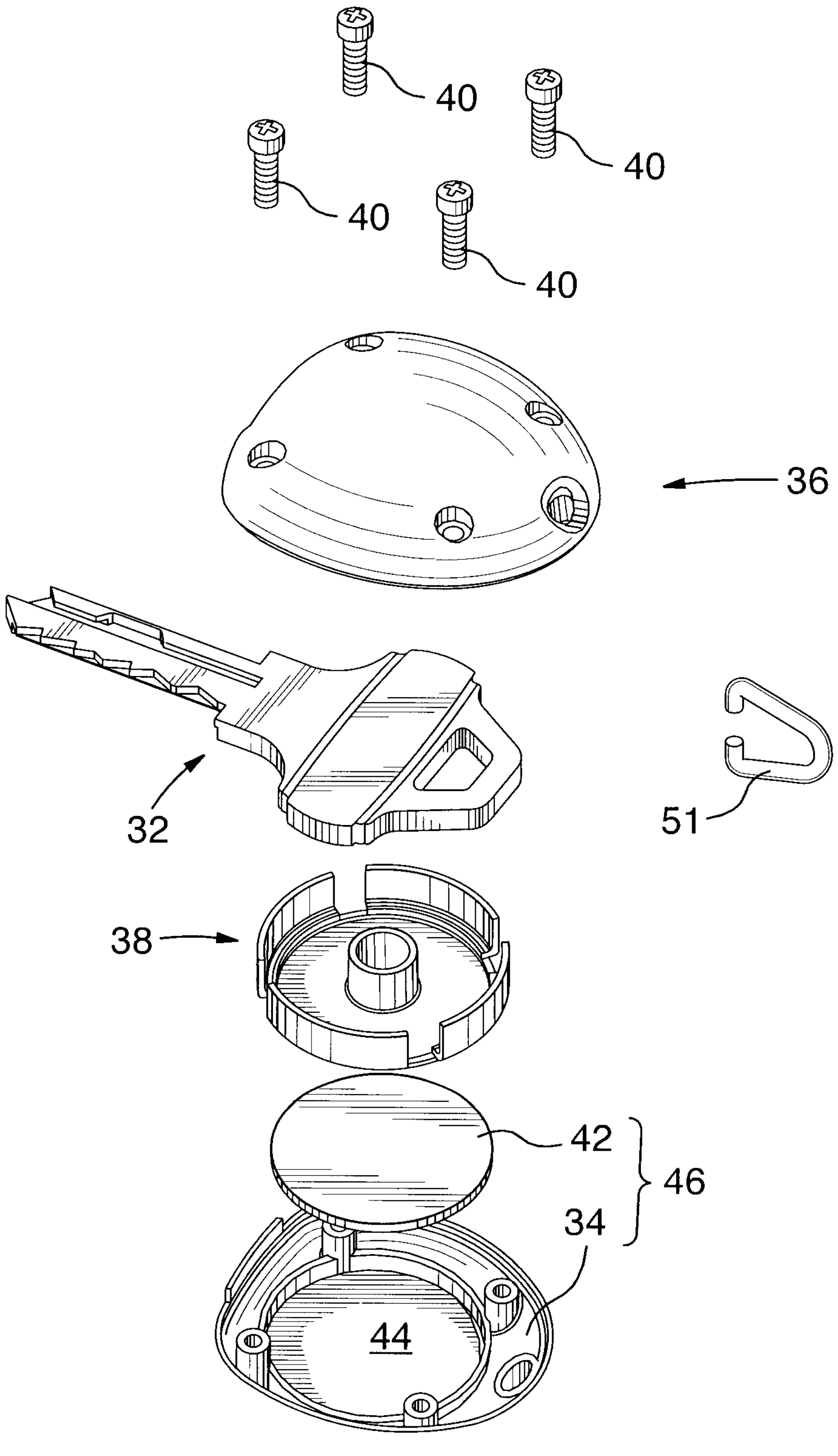
FIG. 3 is a view of the structure of FIG. 2, from an opposite vantage point.

In FIGS. 2 and 3, the adapter 22 is shown in exploded perspective, in combination with a mechanical key 32 (the key 32 forming no part of the invention), and will be seen to comprise a top 34 and bottom 36 shell, an insert 38, machine screws 40 and an electronic credential 42. The top 34 and bottom 36 shell and the insert 38 are injection-molded plastic components. The machine screws 40 are steel. The exemplary credential 42 is an RFID assembly which is composed of an antenna and an integrated circuit (neither being visible in the figures).

Figure 4:
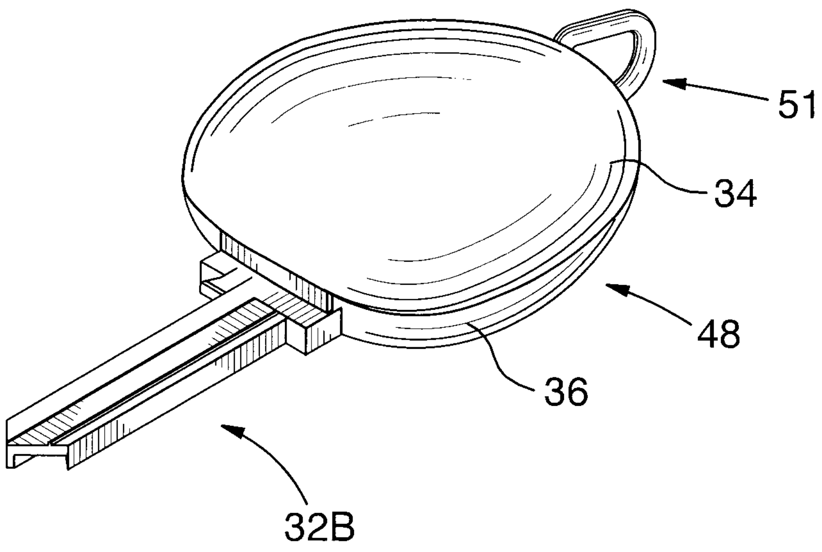
FIG. 4 is an assembled view of the structure of FIG. 2.

The manner in which the adapter 22 is used will be clearly understood upon a review of the sequence of FIGS. 2,4. The bottom shell 36 defines a receiver which, in use, receives the head 32A of the mechanical key 32. To provide for such receipt of the head 32A, a boss 41 protrudes from the interior of bottom shell 36 to engage in snug-fitting relation inside aperture 43 formed in the key head 32A. The electronic credential 42 is adhesively secured within a socket 44 in the top shell 34 to define a coupler 46. The insert 38 is stacked upon the key 32, and the coupler 46 is stacked on the insert 38. The top shell 34 is securely engaged to the receiver 36 by the machine screws 40. Adhesive is also used, to permanently connect the shells 34,36. The assembly of top shell 34, bottom shell 36, insert 38, credential 42 and machine screws 40 together define a body 48 which is securely coupled to the key head 32A, leaving the key blade 32B exposed for use, as shown in FIG. 4. A D-shaped ring 51 is coupled to body 48 in use, to allow the entire assemblage to be hooked to a key chain or the like.

It will be noted that the key 32 is offset in the body 48, being held by the insert 38 away from the credential 42. This is important, as the operating range of RFID credentials of this type decreases significantly in close proximity to a metal object. At the same time, the offset configuration maintains a relatively slim overall profile of the key-body assembly, which is important for consumer acceptance.

The activation apparatus 24, which is for use with a key to which a body is securely coupled, i.e. a structure as shown in FIG. 4, comprises an RFID reader/writer which is operable for encoding said RFID assembly to produce an RFID-tagged mechanical key which bears: (i) a site code; (ii) an ID number; and (iii) a dealer number. The construction of RFID credentials and reader-writers is a matter of routine to persons of ordinary skill in the art, and as such, is not described herein in detail.

The sensor apparatus 26 bears similarity to a standard RFID reader of the type which, in use, is deployed at an electronically locked doorway to a controlled access area and, in the presence of an RFID credential, outputs data in the standard Wiegand format to a security panel (none shown). The security panel compares the received data against its own database and unlocks the door if the database indicates that the bearer of the credential is authorized to enter the controlled access area. However, the exemplary sensor apparatus 26 departs from convention in that it also has associated with it a dealer number, and is adapted to output data only in the presence of a RFID-credential which is encoded with the same dealer number. If the dealer number in the credential and the dealer number in the sensor apparatus do not match, no Wiegand data is transmitted. If the dealer number in the credential and the dealer number in the sensor apparatus do match, the site code and ID number data stored in the credential are transmitted to the security panel in a conventional manner.

The marking apparatus 28 is for is creating visual demarcations on the bodies 48. In the exemplary embodiment, the marking apparatus 28 takes the form of a laser engraving machine, such as the engraving machine sold by Universal Laser Systems Inc. under the trade-mark Versalaser.

The controller 30 takes the form of a personal computer and associated software that is adapted to communicate with and drive the activation apparatus 24 and marking apparatus 28. The creation of software for driving a RFID reader/writer and a marking device such as an engraver is a matter of routine to persons of ordinary skill in the art, and such, is also not described herein in detail. The operation of the controller 30 is best described in use of the system, which follows hereinafter.

Use of the System

The provider of the system makes available to its dealers, who would normally be locksmiths, the various components of the system 20.

Each dealer is assigned by the provider a unique dealer number and is provided with an activation apparatus 24, a marking apparatus 28, the associated software, a supply of sensor apparatus 26 and a supply of adapters 22. The dealer can also be provided with a computer, if a suitable computer is not available. The software given to the dealer has encoded therein the unique dealer number assigned to the dealer by the system provider.

Each dealer only receives from the provider sensor apparatuses which bear its assigned dealer number. The adapters provided to the dealer are of varied types, each type being adapted for use with a different type of mechanical key. The supply of adapters provided to each dealer is representative of the mechanical keys which are in common use in the region in which said each dealer operates.

Each dealer in turn makes the system available to its customers and prospective customers.

Customer recipients of the system could include facilities which rely entirely on mechanical key access control, and which wish to supplement facility security with additional electronic access control. In this case, the dealer would supply a sensor apparatus and electronic lock for each new electronic access control point as well as a security panel and access control software, for receiving information from the sensor(s) and for controlling the lock(s).

Recipients of the system could also include facilities which have an existing mixture of mechanical and electronic access control. In this case, the dealer would typically supply a sensor for each existing access point, to be substituted for the existing RFID reader; because the sensors output data in standard Wiegand format, they can be used with virtually any manufacturer's panel, and there would be no need to supply a security panel.

At the facility, the dealer installs the sensors, along with any required electronic locks and security panel.

The dealer also distributes RFID-tagged mechanical keys, i.e. as shown in FIG. 4 but which have been encoded with the site number for the facility, with the number of the dealer and a unique ID number, and which have also been engraved with the image of the authorized key bearer.

The permutations associated with this aspect of the installation process will vary, depending upon the circumstances of each deployment, but an efficient mechanism would be for the customer to whom the system is to be provided to gather up all the mechanical keys for the facility, and provide to the dealer a collection of electronic images of each person to whom a key is to be issued.

In the case of a new install, for example, the customer would also provide details as to the level of access permitted to each person.

Upon receipt of the keys and the images, the dealer secures suitable adapters to each key, loads the electronic images into the controller and initiates the controller for an encoding session.

When an encoding session is invoked, the operator specifies the site code and the number of credentials to be produced. Thereafter, the software prompts the operator to place the adapter bodies, one after another, firstly on the activation apparatus and thereafter on the engraving machine. At the conclusion of this procedure, for each person to whom a key is to be issued, a mechanical key has been produced which bears the image of said each person. Each of the keys is also RFID-tagged; each has a unique ID number, as well as the site code and dealer code.

Figure 5:
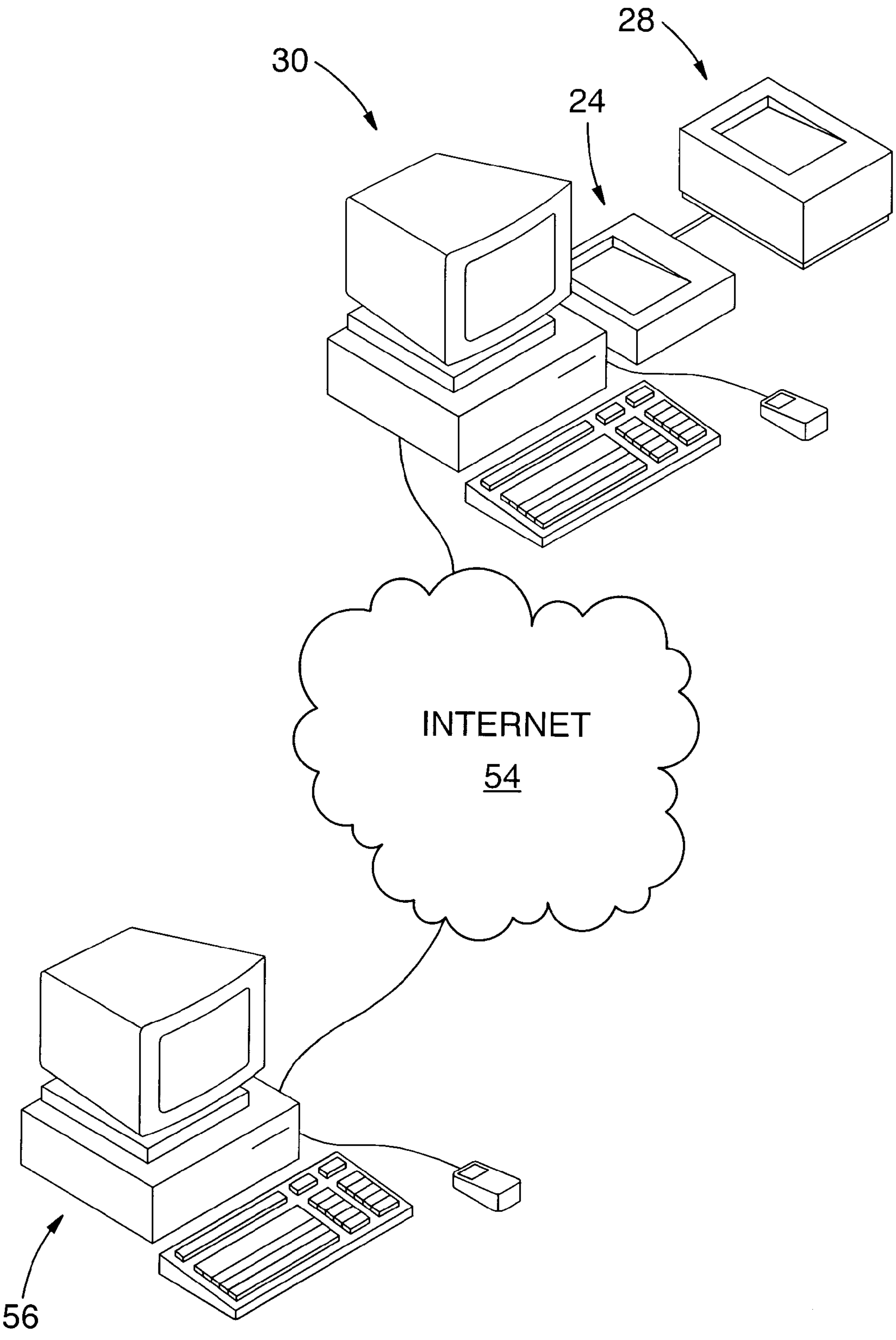
FIG. 5 is a view of encircled structure 5 in FIG. 1 in installation of a system according to an exemplary embodiment of the present invention.

To conclude the installation, the keys are returned, each to the person whose image is engraved thereon and, as necessary, the security panel 54 of the customer is updated by the controller 30 of the dealer via secure communication over the Internet 54, as indicated in FIG. 5.

Persons of ordinary skill in the art will readily recognize the numerous advantages associated with all of the above:

- facilities with mechanical locks can introduce electronic access control functionality into selected areas, without the need for separate mechanical and electronic keys;
- facilities with mixed mechanical-electronic lock systems can obtain combined mechanical-electronic keys with no need for reprogramming
- etching allows the mechanical-electronic key to additionally serve in the manner of an identification card;
- the adapters allow for the reuse of mechanical keys, which is advantageous in terms of capital costs and labor costs associated with key-cutting; and
- dealers sell a proprietary line of credentials and readers, so that their customers cannot purchase additional/replacement sensors or credentials from any other source Various modifications of the above are contemplated.

For example, whereas an engraving machine is employed in the exemplary embodiment, it will be evident that a conventional printer could be used to mark adhesive labels, for similar utility. The label could fit into a recessed area on the key body and be made of a durable material.

As well, whereas it is indicated above that the image of the authorized keyholder would be demarcated on the adapter body, other data, such as the name of and ID number of the authorized keyholder and the system code could be demarcated thereon, either by engraving or labelling.

As well, whereas fairly limited functionality of the controller is expressly described above, other functionality could readily be incorporated. For example, the controller could maintain a database of all customers of the dealer, i.e.

| | |
|---|---|
| company name | shipping address |
| address | billing address |
| phone number | customer number |
| contact name | |

As well, the controller could create an audit record for each encoding session, i.e.:

| | |
|---|---|
| encoding session | site code number |
| date/time | starting and ending ID |
| operator ID | number |
| customer number | |

Further, whereas in the description it is indicated that a unique identifier is assigned to each key, it will be understood that this would not normally be a random event. Rather, a database would be maintained by the controller. For a new customer with no existing electronic access control, ID numbers would normally be assigned starting, for example, at 00001 and increasing in increments of one thereafter.

However, if an operator was attending at a facility where access control already existed, and he or she was merely exchanging sensors and distributing keys, the operator would set up the encoding session such the key encoded for each employee was encoded with the existing identification number assigned to that employee, so that the existing security panel would require no reprogramming. Similarly, if an operator wished to provide additional keys to an existing customer, the controller could, upon activation of a session, default to an encoding operation wherein the first ID number assigned starts where the previous session left off.

Further, whereas the previous description makes mention of an encoding operation for each key, followed by engraving/demarcation, it is recalled that the encoding is carried out by a RFID reader-writer. After the encoder has completed the encoding activity on a given key, the controller would normally prompt the reader-writer to read the key, to ensure that that the data was transcribed correctly from the controller to the key. Only after the encoding had been verified would the controller prompt for the key to be demarcated.

As well, whereas it is described that updating of the security panel of the customer is done via secure Internet communication, it will be evident that this could, for example, by done manually, and that in some deployments, no updating of the security panel will be required.

Further, whereas it is hereinbefore indicated that adapters are utilized, as another alternative, it would be possible for the dealers to be provided RFID-enabled key blanks, of varying types representative of the mechanical keys which are in common use in the region in which said each dealer operates. Instead of collecting and adapting the existing keys, the dealer could instead cut the blanks to fit the locks of the facility in question. If blanks having a shape substantially different than the blanks provided by the OEM manufacturer were utilized, a custom key cutter would likely be required.

As well, whereas it is described that adhesive is used, to permanently connect the shells, it could be possible to permanently connect the shells, for example, by sonic welding. Further, the shells could also be held together only by the machine screws, if the facility in question wanted to have the ability to, for example, reuse the adapter of a user if the cylinder of the mechanical key was exchanged.

In view of all the foregoing, it will be understood that the present invention should be understood as limited only by the accompanying claims, purposively construed.

The invention claimed is:

1. An adapter for converting a conventional mechanical key to an RFID-tagged key, the mechanical key including a blade portion insertable into a mechanical lock and a conventional head portion by which said key is held when said blade portion is being inserted into a lock, the adapter comprising a body having a first shell portion and a second shell portion, said shell portions being positionable on either side of said conventional mechanical key head to form an assembled body surrounding said mechanical key head but leaving said key blade exposed, said first shell portion defining a socket for receiving an RFID credential, said second shell portion defining structure for receiving at least a portion of said key head in a snug fitting relationship, said mechanical key head not requiring reshaping or machining in order to be received by said second shell portion structure, said first shell portion being shaped such that said RFID credential is spaced from an associated side of said mechanical key head, said first shell portion and said second shell portion being joined together to form said body that surrounds said mechanical key head and by which said mechanical key is manipulated when said key blade is inserted in an associated mechanical lock whereby an RFID-tagged mechanical key is formed.

2. The adapter of claim 1 wherein said RFID credential is maintained in a spaced relationship with said associated side of said mechanical key head by an insert.

3. The adapter of the claim 1 wherein said first shell portion defines a boss for receiving an aperture formed in said key head wherein said snug fitting relationship is at least partially created by the engagement of said boss with said key head aperture.

4. The adapter of claim 1 wherein said first shell portion and said second shell portion are held together by a plurality of fasteners.

5. The adapter of claim 1 wherein said assembled body defines an aperture for receiving a key ring.

6. The adapter of the claim 1 wherein said structure of said second shell portion defines a recess that is shaped to snuggly receive said mechanical key head.

7. The adapter of claim 1 wherein said first shell portion, second shell portion and said insert are injection molded.

* * * * *